(12) United States Patent
Flohr et al.

(10) Patent No.: US 9,890,720 B2
(45) Date of Patent: Feb. 13, 2018

(54) METHOD AND DEVICE FOR OPERATING AN INTERNAL COMBUSTION ENGINE

(71) Applicant: MTU Friedrichshafen GmbH, Friedrichshafen (DE)

(72) Inventors: Andreas Flohr, Manzell (DE); Andreas Geller, Ulm (DE); Alexander Bernhard, Meckenbeuren (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 41 days.

(21) Appl. No.: 14/780,939

(22) PCT Filed: Jan. 20, 2014

(86) PCT No.: PCT/EP2014/000140
§ 371 (c)(1),
(2) Date: Sep. 28, 2015

(87) PCT Pub. No.: WO2014/154312
PCT Pub. Date: Oct. 2, 2014

(65) Prior Publication Data
US 2016/0040611 A1 Feb. 11, 2016

(30) Foreign Application Priority Data
Mar. 28, 2013 (DE) .................. 10 2013 205 725

(51) Int. Cl.
*F02D 41/00* (2006.01)
*F02D 19/06* (2006.01)
(Continued)

(52) U.S. Cl.
CPC ..... *F02D 41/0007* (2013.01); *F02D 19/0642* (2013.01); *F02D 23/02* (2013.01);
(Continued)

(58) Field of Classification Search
CPC ....... Y02T 10/40; Y02T 10/44; Y02T 10/126; F02D 41/0007; F02D 41/0002;
(Continued)

(56) References Cited

U.S. PATENT DOCUMENTS 6,131,652 A   10/2000  Paielli et al.
6,273,076 B1   8/2001  Beck et al.
(Continued)

FOREIGN PATENT DOCUMENTS

EP       0484884 A2   5/1992
EP       1398490 A2   3/2004
WO       2012143997 A1   4/1993

*Primary Examiner* — Long T Tran
(74) *Attorney, Agent, or Firm* — Lucas & Mercanti, LLP; Klaus P. Stoffel

(57) ABSTRACT

A method for operating an internal combustion engine, which has: an intake section and an engine with an number of cylinders and a receiver which is arranged upstream of the cylinders wherein the intake section has: a supercharging system with a compressor and a bypass for bypassing the supercharging system, and wherein the receiver is assigned an engine throttle, and the bypass is assigned a compressor bypass throttle; and a setting of the engine throttle and/or of the compressor bypass throttle is set as a function of the operation in order to influence a charge fluid. The intake section is assigned an intake section model by which at least a mass flow and/or state of the charge fluid upstream of the engine are/is determined and on the basis of a determination result the compressor bypass throttle is set as a function of the engine throttle.

18 Claims, 3 Drawing Sheets

(51) Int. Cl.
  *F02D 23/02* (2006.01)
  *F02D 41/18* (2006.01)
  *F02D 41/26* (2006.01)
  *F02D 41/14* (2006.01)
  *F02B 37/16* (2006.01)

(52) U.S. Cl.
  CPC ...... *F02D 41/0025* (2013.01); *F02D 41/0027* (2013.01); *F02D 41/18* (2013.01); *F02D 41/263* (2013.01); *F02B 37/16* (2013.01); *F02D 2041/1433* (2013.01); *F02D 2200/0402* (2013.01); *Y02T 10/36* (2013.01)

(58) Field of Classification Search
  CPC ............ F02D 41/18; F02D 2200/0406; F02D 2200/0402; F02D 2041/1412; F02D 23/00; F02D 2041/1433; F02D 2200/0404
  See application file for complete search history.

(56) References Cited

U.S. PATENT DOCUMENTS

| | | | | |
|---|---|---|---|---|
| 6,474,323 | B1 * | 11/2002 | Beck | F02B 29/0412 123/679 |
| 6,947,831 | B2 * | 9/2005 | van Nieuwstadt | B01D 46/0036 123/193.6 |
| 7,204,213 | B2 * | 4/2007 | Weber | F01L 13/0015 123/90.12 |
| 7,357,125 | B2 * | 4/2008 | Kolavennu | F02B 37/02 123/568.11 |
| 7,913,675 | B2 * | 3/2011 | Bailey | F02B 19/12 123/568.21 |
| 7,926,335 | B2 * | 4/2011 | Wegener | F02B 37/16 73/114.77 |
| 8,180,553 | B2 * | 5/2012 | Buckland | F02B 37/007 60/602 |
| 8,469,000 | B2 * | 6/2013 | Ouwenga | F02B 39/04 123/337 |
| 8,474,258 | B2 * | 7/2013 | Mahakul | F02B 37/001 60/605.2 |
| 2003/0213462 | A1 * | 11/2003 | Weber | F01L 13/0015 123/305 |
| 2007/0089715 | A1 * | 4/2007 | Kolavennu | F02B 37/02 123/568.11 |
| 2012/0291432 | A1 | 11/2012 | Ulrey et al. | |
| 2014/0034026 | A1 | 2/2014 | Katsumata et al. | |

* cited by examiner

METHOD AND DEVICE FOR OPERATING AN INTERNAL COMBUSTION ENGINE

The present application is a 371 of International application PCT/EP2014/000140, filed Jan. 20, 2014, which claims priority of DE 10 2013 205 725.3, filed Mar. 28, 2013, the priority of these applications is hereby claimed and these applications are incorporated herein by reference.

BACKGROUND OF THE INVENTION

The invention relates to a method for operating an internal combustion engine, in particular a gas internal combustion engine, having an intake section and an engine with a number of cylinders. The invention also relates to a closed-loop control system for the internal combustion engine, and to an internal combustion engine. The internal combustion engine has, in the intake section, a supercharging system and a bypass for bypassing the supercharging system.

It is known generally to use throttle elements for load closed-loop control in internal combustion engines. Internal combustion engines are increasingly subjected to transient, that is to say in a most general way non-steady-state, operating modes even in the case of non-mobile applications, with the result that the load closed-loop control assumes increasing importance.

This proves comparatively complex, in particular, in gas internal combustion engines. Application fields of gas internal combustion engines are mobile applications, such as, for example, in the field of shipping or in the field of utility vehicles and heavy-duty motor vehicles, as well as stationary applications such as in block power stations, which are to be advantageously configured, in particular, for a fluctuating gas supply.

U.S. Pat. No. 6,131,552 generally discloses a fuel control system which can regulate the supply of gas to a mixture chamber as a function of a measured operating state of the engine. The control method in U.S. Pat. No. 6,131,552 A or other only load-dependent gas-metering systems also proves inadequate in the case of complex regulating systems.

Volumetric efficiency is usually a measure of the gaseous fresh charge of charge air which is supplied to an internal combustion engine in a charge mixture, wherein the volumetric efficiency also permits conclusions to be drawn about the quality of the intake system and of the intake process. The actual volumetric efficiency generally represents the ratio of the mass of fresh air in a charge mixture, which is actually fed to the engine or cylinder thereof during a working cycle. This real mixture mass is determined, with respect to the theoretical fresh charge mass, from the geometric swept volume and the theoretical charge density in the environmental state (in the case of freely aspirating engines), and in the case of supercharged engines the state of the fresh charge downstream of the compressor or downstream of the charge air cooler is taken into account here.

A series of factors, for example, the valve control times or the opening cross section of the valves, influence the fresh charge which is fed to a cylinder. Generally, these factors can be determined from a module for determining the supercharging of the engine to which an intake section model is stored. However, the fresh charge fed to the engine in a charge mixture actually corresponds to the theoretical only in exceptional cases. The volumetric efficiency is not a constant number for an engine but instead is dependent to a large degree on the rotational speed and the geometric conditions of an intake section and a combustion chamber which are present; to overcome this dependence it is possible to take into account, for example, a suitable characteristic diagram.

Intake section models are, in turn, known in engine regulators, basically in general internal combustion engines such as, for example, from EP 1 398 490 A2. These engines have in common the fact that by modeling the intake section—in the simplest case as a homogeneous pressure vessel in order to sense the dynamic processes in the air path—as a widespread basic concept, the storage behavior of the intake section (also referred to as intake manifold) is modeled by means of the filling and emptying method. In this context, the intake manifold is treated as a pressure vessel which is continuously filled with air through a throttle valve and from which the engine sucks air via the inlet valve through its intake behavior corresponding to the working cycle.

However, it becomes apparent that a fuel supply of a gas internal combustion engine, in particular in the transient operating range of the internal combustion engine and with variable fuel qualities is much more complex. In addition, in the case of gas internal combustion engines it becomes apparent, in particular with respect to the formation of a spark-ignition gas internal combustion engine, that generally a load regulation, in particular the operation in the low load range and/or in the transient load range, can be problematic. Therefore, generally in the case of internal combustion engines, but in particular in the case of gas internal combustion engines, in the case of load shedding and when the throttle valves close, compressor pumping can occur when the compressor of the exhaust gas turbocharger is operated briefly outside its operating range as a result of a rapid reduction in the gas mass flow which is being fed by it. Furthermore, a load cut-in potential of a gas engine is very limited if said potential is opened in the steady-state mode.

At the same time, the intake section between the compressor outlet and the combustion chamber inlet is composed, in some cases, of large volumes which, as a result, store or output significant mixture masses. This applies, in particular, when pressure changes and/or temperature changes occur in the individual partial volumes when there are changes in load and/or rotational speed of the engine. As a consequence of mixture mass formation in a gas internal combustion engine which is, however, adapted only to a restricted degree to the operating point, and which is imprecise owing to the, in some cases, large volumes, high hydrocarbon emissions (HC emissions) or other increased emissions (NOx, CO or particles etc.) as well as poor efficiency levels as a result of unburnt combustion gas are to be expected.

During operation of gas engines, the mixture formation usually takes place upstream of the compressor of the exhaust gas turbocharging system; the present problem relates, in respect of the gas engine, not only to gas engines with central mixture formation but also to those with cylinder-specific mixture formation.

It is desirable to make operation of an internal combustion engine, in particular gas operation of a gas internal combustion engine, more advantageous, in particular in the transient, preferably low-load range, in accordance with the load requirements and emission conditions.

SUMMARY OF THE INVENTION

At this point, the invention comes in, the object of which is to specify a method and a device by means of which improved operation of an internal combustion engine, in particular as a gas internal combustion engine, is achieved. In particular, it is an object of the invention to make available improved load closed-loop control during operation. In particular it is an object of the invention to achieve an improvement in the transient and/or steady-state operating mode. In the transient operating mode, jumps in torque of an engine should preferably be avoided. Within the scope of an improved operating method, improved actuation of throttles, in particular of an engine throttle and/or of a compressor bypass throttle is preferably to be provided; in particular, excessive emissions are to be avoided even in the case of changing load requirements.

In particular am improved internal combustion engine which can be operated in a transient and/or steady-state fashion, in particular as a gas internal combustion engine, should be made available. In particular, a load cut-in capability needs to be configured more advantageously—preferably on the basis of a steady-state operating mode. In particular, compressor pumping needs to be avoided—preferably on the basis of a transient operating mode. In particular, situations to be preferably avoided are those in which a turbocharger has to be operated outside its configured operating range. The object of the invention is also to address at least one of the problems described above. At least one alternative solution is to be proposed.

In this context the basis used is a method of the type mentioned at the beginning for operating an internal combustion engine, having
 an intake section and an engine with a number of cylinders and a receiver which is arranged upstream of the cylinders, wherein
 the intake section has:
 a supercharging system having a compressor and a bypass for bypassing the supercharging system, and wherein
 the receiver is assigned an engine throttle, and the bypass is assigned a compressor bypass throttle.

In the method, a setting of the engine throttle and/or of the compressor bypass throttle is set as a function of the operation in order to influence a charge fluid.

In an optional first aspect, the invention provides that at least one mass flow and/or state of the charge fluid upstream of the engine is determined, in particular in that the intake section is assigned an intake section model, by means of which at least one mass flow and/or state of the charge fluid upstream of the engine is determined.

In a second aspect, the invention provides that—in particular on the basis of a determination result—according to the invention the compressor bypass throttle is set as a function of the engine throttle.

In respect of a particularly advantageous application in a gas internal combustion engine, a mixture portion of a gas-air mixture is correspondingly influenced by setting the engine throttle and/or the compressor bypass throttle in an operationally dependent fashion. In accordance with one development, with respect to the first aspect in the method the intake section is assigned an intake section model by means of which at least one mixture mass flow and/or a mixture state of the mixture portion is determined. In accordance with the concept of the invention, with respect to the second aspect in the method, in particular, the compressor bypass throttle is set as a function of the engine throttle, in particular on the basis of a determination result.

The implementation of the first and/or second aspects is preferably achieved within the scope of an open-loop and/or a closed-loop control dependence.

An intake section model advantageously provides, in particular, the simulation of an intake section within the scope of a closed-loop control of the internal combustion engine, in particular of the gas internal combustion engine. Although intake section models in engine regulators are basically known, the development in this respect is based on the idea that the conventional modeling mentioned at the beginning is already insufficient at the outset—even for using the gas engine, in particular with mixture formation upstream of a compressor and/or throttle valve regulation at a compressor bypass and/or at an engine supply section. In particular, it is apparent that a required gas mass flow such as is determined directly from the mixture mass flow for steady-state operation and which is determined merely from volumetric efficiency at the engine is inadequate.

The development optionally takes into account, in this respect for the first aspect of the invention, the idea that a distance between the location of sucking in the charge fluid and the location of a combustion chamber inlet can be comparatively long, and therefore per se comprises a comparatively large volume which can hardly be realistically described in a steady state. In particular, in the case of a gas engine a distance between the location of the mixture formation, e.g. upstream of the compressor of the exhaust gas supercharging system and the location of a combustion chamber inlet proves to be comparatively long, and therefore comprises per se a comparatively large volume which can hardly be described realistically in a steady state. The partially large volumes can in fact store or output significant mixture masses if pressure and/or temperature changes occur in the individual partial volumes when there is a change in the load and/or rotational speed of the engine.

In the optional first aspect it has been recognized that as a result the mass flow and/or state of the charge fluid or—especially in the case of a gas engine the mixture mass flow and/or mixture state at the outlet of the gas mixer—is temporally decoupled from that of the combustion chamber inlet. This state has hitherto not been sufficiently taken into account in intake section models, whether for a gas engine or any other internal combustion engine. In particular, conventional steady-state considerations of a gas engine in which only the mixture pressure upstream of a cylinder is considered therefore, as is recognized by the optional first aspect of the invention, is not expedient in ensuring compliance with defined combustion air conditions.

The concept of the invention provides, stated simply, that, after at least one mass flow and/or state of the charge fluid—in particular at least one mixture mass flow and/or mixture state of the mixture portion—upstream of the engine is determined in the first aspect preferably on the basis of an intake section model, according to the invention in the second aspect, in particular on the basis of a determination result, the compressor bypass throttle (VDBK) is set as a function of the engine throttle (DK). Additionally or alternatively to a setting of a throttle, in particular an opening cross section thereof is determined. In this context it is to be borne in mind that this applies, in particular, to a transient operating mode of the internal combustion engine. This is preferably implemented either with a first relatively fast timescale or one of the of a second relatively slow timescale, in particular for the transient operating mode. For a steady-state operating mode, the transient compressor bypass throttle actuation can, in this respect, be insignificant since the latter is inactive. The selection of a compressor bypass throttle actuation as a function of the engine throttle is therefore subject to a validity value which shows that the compressor bypass throttle and/or the engine throttle is opened.

Overall, the invention has the advantage that—in particular in the case of a transient operating mode—a setting of the compressor bypass throttle (VDBK) as a function of the engine throttle (DK) can be selected such that the turbocharger is relieved of loading. This also has the advantage that, in particular in the case of an operating mode which is based on a steady-state operating mode—a setting of the compressor bypass throttle (VDBK) can be selected as a function of the engine throttle (DK) in such a way that the turbocharger can already build up a better load cut-in potential in or on the basis of a steady-state operating mode.

Basically the concept of the invention extends, as claimed, generally to any type of charged internal combustion engine with a combustion engine which has a first and a second throttle element, in particular throttle valve, which are used for load closed-loop control. The engine throttle is formed, in particular, as a first throttle valve. The compressor bypass throttle is formed, in particular, as a second throttle valve.

However, the concept has proven particularly expedient for use in a gas internal combustion engine; in particular since this should additionally take into account the mixture formation in a central or cylinder-specific fashion. In particular, the concept can also particularly advantageously be applied for gas internal combustion engines with central mixture formation upstream of a compressor, i.e. preferably with a gas mixer and/or with cylinder-specific mixture formation, i.e. upstream of a cylinder. In particular, this can relate to spark-ignited gas internal combustion engines. Basically, the concept of the invention is, furthermore, also suitable for pilot injection internal combustion engines, i.e. in particular diesel gas internal combustion engines or other dual-fuel internal combustion engines, and this is also the case with central and also cylinder-specific mixture formation.

In this respect, neither a gas mixer nor an injection system for liquid fuel are necessary for implementing the concept of the invention in an internal combustion engine; however, they can be provided in a preferred developments.

As a result, the concept of the invention provides for the first time independent and chronologically optimized actuation of a throttle system with metered reaction times depending on the operating state of a gas internal combustion engine, since the compressor bypass throttle (VDBK), in particular an opening cross section thereof, is set on the basis of a determination result of a mass flow and/or of a state of the charge fluid upstream of the engine, as a function of the engine throttle (DK), in particular of an opening cross section thereof. In particular, this relates to the actuation of the compressor bypass throttle, in particular compressor bypass valve, as a function of the engine throttle, in particular engine throttle valve.

The actuation does not require complex characteristic diagram data or additional sensors. A mixture mass flow across a throttle, in particular a valve, can be determined in a spatially model-based fashion and be implemented in a chronologically differential manner or in finite time steps in a transient fashion with a certain step rate and be adapted to a configuration of the internal combustion engine according to requirements. As a result, a virtual valve sensor or throttle sensor, for example in the case of VBP valve or engine valve can be made available.

The object relating to the device is achieved by means of a closed-loop control system for an internal combustion engine.

The concept of the invention for achieving the object with respect to the device also leads to an internal combustion engine.

In particular, it has proven advantageous to provide the internal combustion engine, in particular gas internal combustion engine, with a supercharging system in the intake system, in particular with a supercharging system comprising a charge-type heat exchanger. Depending on the dimensioning of the internal combustion engine or gas internal combustion engine, in particular on the basis of a large engine, a supercharging system can be provided in a single-stage or two-stage fashion, preferably with exhaust gas recirculation. In particular, a bypass section is also be provided to the intake section of the intake system for bypassing the supercharging system. It has proven advantageous to provide corresponding actuators for influencing the charge pressure such as, for example, plates, valves, throttles, in particular a throttle valve upstream of the receiver volume and/or upstream of a compressor bypass valve in the bypass section. Thus throttling of the engine can therefore be carried out depending on a SETPOINT and/or ACTUAL charge pressure of the intake section.

In particular, an internal combustion engine can have an intake system with an intake section—preferably with a gas mixer or a cylinder-specific gas mixture—and the engine with a number of cylinders. In one modification, an injection system can also be provided which is advantageously embodied as a common rail injection system. Furthermore, it has proven advantageous to arrange a receiver volume to the number of cylinders upstream of the cylinders, in particular in the intake section model which can be embodied, for example, in the form of a manifold or a mixing section or the like, or describes a manifold or a mixing section in the intake section model.

As is shown, in particular, in circular process simulations and trials on gas engines, the invention improves the stability of the combustion air ratio, in particular, in the case of transient engine operation (load cut-in/shut-off operations) with the result that, on the one hand, relatively large load jumps can be displayed and, on the other hand, simpler adjustment of the load switching operation, also on a test bench, becomes possible.

This and other advantageous developments of the invention can be found in the dependent claims and provide in particular advantageous possible ways of implementing the concept of the invention within the scope of developments and by specifying further advantages. The dependent claims relate largely to a gas internal combustion engine and specify in this sense a mass flow of the charge fluid upstream of the engine already as a mixture mass flow of a gas-air mixture upstream of the engine and the state of the charge fluid upstream of the engine as a mixture state of a gas-air mixture upstream of the engine. Nevertheless, it should be understood that the concept of the dependent claims is not limited to a gas internal combustion engine but instead can basically be extended to a general supercharged internal combustion engine on the basis of claim 1; in this respect, the following description relating to a mixture state of a gas-air mixture can be understood generally as referring to a state of the charge fluid and relating to a mixture mass flow can be generally understood as referring to a mass flow of a charge fluid. A charge fluid is preferably to be understood in this respect as referring to charge air or to a charge air/exhaust gas mixture, in particular in the case of a generally supercharged internal combustion engine, or charge air in the case of a cylinder-specific gas mixture formation in the case of a gas internal combustion engine. A gas-air mixture is to be understood, in particular, as a combustion gas-air mixture in a gas internal combustion engine with central mixture formation, in particular in a gas mixer, but is not limited thereto.

In one particularly preferred development relating to the first aspect, there is also provided:
- a division of the intake section—i.e. between the gas mixer and engine—into a plurality, in particular at least two, volumes, preferably precisely two large volumes, one of which is the receiver volume, and/or
- the use of the filling and emptying method and/or the use of pressure information and temperature information of measuring points which are already present. The filling and emptying method, in particular using pressure information and temperature information, of measuring points which are already present can be used for the intake section model. Within the scope of the first aspect, the mixture mass flow and/or mixture state of the mixture portion in the receiver volume can therefore already be particularly advantageously taken into account.

One development in the second aspect is based on the idea that in internal combustion engines generally and gas engines in particular which are operated as spark ignition engines, the improved regulated use of the throttle valves for closed-loop load control assumes increased significance, for example within the scope of quantity closed-loop control. Accordingly, in the second aspect the model-based throttle valve control is firstly ensured from the outset, specifically the setting of the compressor bypass throttle (VDBK) is ensured as a function of the engine throttle (DK), in particular the intake-section-model-based control of an engine throttle valve and/or of a compressor bypass valve.

Preferably, this can be implemented within the scope of a simultaneous real-time determination. By means of the concept of the second aspect, an intake-section-model-based actuation of the compressor bypass throttle (VDBP) and/or of the engine throttle valve (DK) is provided in the case of transient load changes. In particular, the concept serves to bring about, for actuation of the compressor bypass, differential changes in the mixture mass flow which is determined in a model-based fashion, via at least one throttle valve, preferably via the engine throttle valve (DK) and/or the compressor bypass valve (VBP).

Within the scope of one particularly preferred development in a third aspect there is also provision that the mass flow and/or state of the charge fluid—specifically the mixture mass flow and/or mixture state of the mixture portion in the case of a gas engine—is determined on a first relatively slow timescale and a second relatively fast timescale, and the compressor bypass throttle (VDBK) is set as a function of the engine throttle (DK), optionally on the basis of one of the timescales. An operating mode of a steady-state operation or of transient operation is preferably selected by forming at least one differential value across the engine throttle (DK) relating to the mixture mass flow and/or the mixture state of the mixture portion. For example, one of the operating modes of steady operation or of transient operation can be detected by means of a differential value of a mass flow difference and/or a pressure difference or some other mixture state across the engine throttle (DK).

The development is based on the idea that an advantageous transient operation of a gas internal combustion engine should take place as far as possible taking into account a charge pressure of the intake section, in particular taking into account throttling of the charge air—in the engine throttle valve and/or in the compressor bypass valve. This can be advantageous, in particular, also when switching over between gas operation and diesel operation. In both cases, the particularities of a gas engine are to be taken into account.

Therefore, even in the case of highly dynamic processes a turbocharger can be relieved of loading. For example, compressor pumping or generally an operating mode of a turbocharger outside its defined operating range can be avoided. In a steady-state operating mode, the dependence can be used to improve a load cut-in potential. The development provides, in the third aspect, a basis for selecting, as a function of the operating mode of the internal combustion engine, a closed-loop control system whose timescale is matched to the dynamics. It is therefore possible, in one particularly preferred embodiment, for the compressor bypass valve to be actuated by using a fast, less precise signal for the mass flow via throttle valves on the basis of a flow equation and a slow more precise signal from the intake section model.

In particular, it has proven advantageous that the mass flow and/or state of the charge fluid—in particular the mixture mass flow and/or mixture state of the mixture portion—is determined on a first relatively slow timescale and on a second relatively fast timescale simultaneously in real time—i.e. in real time at the actual operating sequence. Data on the mass flow and/or state of the charge fluid, in particular mixture mass flow and/or mixture state of the mixture portion, corresponding to the operating state is made available in an up-to-date fashion. A virtual sensor is advantageously provided which supplies, in real time, values on the mass flow and/or state of the charge fluid, in particular mixture mass flow and/or mixture state of the mixture portion.

Additionally or alternatively, it has proven advantageous that the mass flow and/or state of the charge fluid, in particular mixture mass flow and/or mixture state of the mixture portion are/is determined parallel to one another on a first relatively slow timescale and on a second relatively fast timescale. This results in preferred possibilities of an adjustment of operating states which are determined in a virtual fashion; with this development a selectable basis is provided for enabling closed-loop control to be performed. In particular, the closed-loop control can optionally be developed on a first database as on the relatively slow timescale or on a second database as on the relatively fast timescale. The first possibility can provide advantages with respect to precision. The second possibility can provide advantages with respect to a reaction time of the closed-loop control with respect to transiently changing operating conditions.

A mass flow, in particular mixture mass flow, is advantageously determined via the engine throttle (DK) for the setting of the engine throttle in a directive fashion, i.e. in a first closed-loop and/or open-loop control stage; and this is done optionally on a first or on a second timescale or parallel to one another on both timescales, in particular in such a way that comparison values from each of the timescales can be available in an assignable way and/or can be adjusted. Additionally or alternatively, a state, in particular mixture state, in the receiver can be taken into account in a controlling fashion, i.e. in a first closed-loop and/or open-loop control stage, on a first and/or second timescale, in particular in such a way that comparison values are made available and/or adjusted. It is therefore possible to close closed-loop control on an advantageous timescale or coefficients of a fast and slow closed-loop and/or open-loop control stage can be adjusted. Preferably, in the case of steady-state operation of the internal combustion engine, computation results relating to a first relatively slow timescale relating to the steady-state operation and computational results relating to a second relatively fast timescale relating to the transient operation can be related to one another. For example, results of a comparison for scaling coefficients of a time-dependent flow equation can be used. This leads to a learning function which results automatically during the operation of the internal combustion engine, and can be used for improved operational adaptation of coefficients of individual closed-loop control units.

For example, the setting of the compressor bypass throttle (VDBK), in particular an opening cross section thereof, can be carried out on the basis of a determination result for steady-state operation, as a function of the engine throttle (DK), in particular a setting thereof and/or an opening cross section thereof, by means of a first relatively slow timescale, and/or on the basis of a determination result for transient operation the setting of the compressor bypass throttle (VDBK) can be carried out as a function of the engine throttle (DK) by means of a second relatively slow timescale.

The setting of the compressor bypass throttle (VDBK) can be carried out as a function of the engine throttle (DK) simultaneously for the first case of a first relatively slow timescale and the second case of a second relatively fast timescale. In particular, within the scope of one particularly preferred development, there can be provision for actuation of the compressor bypass throttle by using a fast—if appropriate less precise—signal for the mass flow via throttle valves on the basis of a flow equation and a slow—if appropriate more precise—signal from the intake section model.

In particular, a comparison of the fast, if appropriate less precise, signal with the, if appropriate more precise, slow signal can be provided in steady-state operation ("autolearn function").

The compressor bypass throttle (VDBK) can be set as a function of the engine throttle (DK) simultaneously for the first case of a first relatively slow timescale and the second case of a second relatively fast timescale. In particular, within the scope of a particularly preferred development, there can be provision for actuation of the compressor bypass throttle by using a fast—if appropriate, less precise—signal for the mass flow via throttle valves on the basis of a flow equation and a slow—if appropriate, more precise—signal on the basis of the intake section model.

The setting of the compressor bypass throttle (VDBK) can particularly preferably be carried out as a function of the engine throttle (DK) by determining a quasi-steady-state mixture mass flow for at least the receiver volume, in particular in addition to the charge-type heat exchanger, preferably by means of the filling/emptying method. In particular, this can be carried out on a first relatively slow timescale.

Particularly preferably the setting of the compressor bypass throttle (VDBK) can be carried out as a function of the engine throttle (DK) by determining a transient mixture mass flow for the engine throttle (DK), in particular by means of at least one time-dependent flow equation. In particular, this can be carried out on a second relatively fast timescale. In particular, in the first case the setting of the compressor bypass throttle (VDBK) is therefore carried out on a fast timescale, preferably as a standard variant for transient operating conditions, and in the second case the setting of the compressor bypass throttle (VDBK) can be carried out on a slow timescale, preferably for transient operating conditions during which the fast timescale cannot be used for numerical reasons. Within the scope of this particularly preferred development, for both variants of the compressor bypass actuation (fast and slow timescales) conceived only for transient operating conditions. The fast timescale is preferably the standard variant which is not used only in cases in which the underlying calculations become invalid or insufficient for numerical reasons. In these cases, the relatively slow timescale is used as an equivalent variant.

Therefore, within the scope of a first partial problem it has been recognized, for example, that—in particular in the case of gas engines—loading shedding and accordingly compressor pumping in the case of closing of the throttle valves can occur; this is the case, in particular, when the compressor of the exhaust gas turbocharger has been operated briefly outside its operating range as a result of a rapid reduction in the gas mass flow which is fed through it. The development has also recognized that by opening a compressor bypass valve (VBP valve) which should be used for controlling the compressor bypass mass flow, the compressor pumping can be avoided. In particular, transient operation can comprise: load shedding, a load cut-in, fuel change. For such cases and for other cases it is possible to provide, for example, that the closing of the engine throttle DK and virtually simultaneous opening of the compressor bypass throttle; in particular with a possible fast closed-loop control reaction within the scope of the concept, avoidance of compressor pumps in the case of load shedding can therefore be avoided.

Furthermore, within the scope of a solution to a second partial problem there can be provision to improve the load cut-in potential of a gas engine by closing the VPB valve; in particular if the latter was open in the steady-state operating mode. It is therefore also possible, for example, to use closing of the compressor bypass throttle in the case of steady-state operation and subsequent opening thereof to increase the load cut-in potential.

In the implementation it is preferably possible to detect an operating mode of steady-state or transient operation in that at least one differential value across a throttle, in particular the engine throttle (DK) relating to the mixture mass flow and/or mixture state of the mixture portion is formed. In particular, for this purpose a mass flow difference and/or pressure difference can be formed and in one of the operating modes can be detected by means of this differential value. This uses in approximately a threshold value closed-loop control which can be carried out in a particularly time-efficient fashion.

It is therefore possible, for example, to detect in an operating mode of transient operation if a differential value across a throttle, in particular across the engine throttle (DK) relating to the mixture mass flow and/or mixture state of the mixture portion is above a limiting value (GW) and/or has a change of sign. These are pieces of information which can be used within the scope of actuation closed-loop control with transient VBP actuation.

Conversely, in an operating mode of the steady-state operation it can be detected if a differential value across a throttle, in particular across the engine throttle (DK) relating to the mixture mass flow and/or mixture state of the mixture portion is below a limiting value (GW) and/or does not have a change of sign.

Furthermore, for actuating a manipulated variable of a throttle it has proven generally advantageous that a first and second throttle, in particular the engine throttle (DK), is assigned a first throttle characteristic diagram and/or the compressor bypass throttle (VDPK) is assigned a second throttle characteristic diagram. Within the scope of a further, particularly preferred development, use of a throttle characteristic diagram is appropriate for bringing about a change in the mass flow over time as a function of a pressure ratio of the VBP section or VBP valve setting (dm/dt=f(pressure ratio across VBP section, VBP valve setting)). For the compressor bypass section, the determination of the SETPOINT-VBP valve opening angle is provided. In particular, a throttle characteristic diagram can specify a quasi-steady-state mass flow.

A throttle characteristic diagram advantageously has a first dependence of a pressure upstream and/or downstream of the throttle. Additionally or alternatively, a throttle characteristic diagram can specify, in a second dependence, a throttle setting. The first and/or second throttle characteristic diagram has, in particular, a quasi-steady-state mass flow in a first dependence of a pressure upstream and/or downstream of the throttle and/or in a second dependence of a throttle setting.

Furthermore, the use of a virtual gas sensor promotes the fulfillment of present and future exhaust gas standards. In particular, a real-time calculation of the mixture mass flows can occur at various points on the intake section in the engine regulator. This can preferably also be used to carry out admixture of those gas mixers by means of the existing gas metering unit, which brings about the mixture mass, determined in a virtual fashion, in the desired combustion air ratio.

In particular, the intake section model can specify at least one mass flow and/or state of the charge fluid, in particular at least one mixture mass flow and/or mixture state of the mixture portion, in the receiver volume and at least one further large volume of the intake section, can take into account, in particular, at least one further large volume of one or more charge-type heater exchangers and/or of the bypass section and/or of the compressor or compressors.

Within the scope of one particularly preferred expansion variant it is possible to form an input mixture portion, assigned to an earlier mixture state, of the gas-air mixture, by means of an output mixture portion, assigned to at least one later mixture state, of the gas-air mixture. In this context it has proven advantageous that the input mixture portion in the earlier mixture state is determined in a closed-loop control system by means of the output mixture portion in the later mixture state, and the determination is carried out by means of the intake section model which serves as a basis of a computational model for the intake section. In particular, the output mixture portion can be determined at an engine feed, and the input mixture portion can be determined at the gas mixer, in particular within the scope of a simultaneously real-time determination. This can be considered to be a specification of a virtual mixture mass sensors between the cylinder input and the gas mixer output.

In the case of a gas engine, the gas operation is preferably spark-ignition gas operation; this proves particularly efficient and proves capable of being implemented suitably for many applications. However, another ignition principle can basically also be suitable, such as for example, an ignition system for diesel or other liquid fuel ignition. In particular, the gas operation can alternatively also be an ignition spray operation with external mixture formation of a gas-air mixture, using a diesel ignition spray or some other liquid fuel ignition spray.

Generally, even though this is not emphasized in the description, there is nevertheless the possibility, not least because of the comparatively constant fuel quality, of operating the gas internal combustion engine either with gas or with liquid fuel such as diesel or liquefied gas. In particular, during operation, a fuel mixture comprising a charge mixture and/or a liquid fuel can then be fed to the engine. In this context, the engine can be operated in a first operating state, in the diesel mode, with diesel or with some other liquid fuel, and in a second operating state, in the gas mode, with gas as the fuel in the charge mixture. This type of gas internal combustion engines are also referred to as multi-fuel internal combustion engines (dual-fuel internal combustion engines) and in addition to the preferred fuel selection of diesel and gas they can be operated with a wide variety of other fuels. In particular, alternatively in the gas mode the gas internal combustion engine can be operated in the ignition spray mode with external mixture formation of a gas-air mixture and a diesel ignition spray. Therefore, engines of the gas internal combustion engine are also referred to as ignition spray engines and are regularly constructed on the basis of a diesel engine design and are among the newest technologies, in particular in the field of environmentally-friendly possibilities for the use of large engines. An ignition spray engine can also be operated with liquid fuel such as diesel or other liquefied fuel such as liquefied natural gas (LNG) or else liquefied natural gas (LTG); a gas internal combustion engine can usually have a gas-diesel engine for forming a gas-diesel internal combustion engine.

In particular, a gas internal combustion engine then has an injection system which can preferably be regulated electronically. In particular, an internal combustion engine can also have for this purpose an injection system which is advantageously embodied as a common rail injection system. In particular, an injection system can be regulated for different gas qualities such as biogas or natural gas, in a liquid form or else for the use of oils such as plant oils or the like as a liquid fuel. Here, in particular, common rail injection systems, but if appropriate also pump-nozzle injection systems with electronic closed-loop control, have proven valuable. The ignition medium in the gas mode can be added to the actual gaseous fuel of the charge mixture in the cylinder under high compression or else can be fed to the intake duct. The gas engines which operate with external mixture formation in the gas mode, in particular spark-ignition gas mode or ignition spray mode, are overall more flexible in the use of fuel and therefore have even lower emissions.

Exemplary embodiments of the invention will now be described below with reference to the drawing in relation to a gas engine. The drawing is not necessarily intended to represent the exemplary embodiments to scale but instead the drawing is embodied, where beneficial for the explanation, in a schematic and/or slightly distorted form. With respect to additions to the teachings which are directly apparent from the drawing, reference is made to the relevant prior art. It is to be noted here that a wide variety of modifications and changes relating to the form and the detail of an embodiment can be made without departing from the general idea of the invention. The features of the invention which are disclosed in the description, in the drawing and in the claims can be essential to the development of the invention both individually and in any desired combination. In addition, the scope of the invention includes all the combinations from at least two of the features which are disclosed in the description, the drawing and/or the claims. The general idea of the invention is not limited to the precise form or the detail of the preferred embodiment which is shown and described below or limited to a subject matter which would be restricted compared to the subject matter claimed in the claims. Given specified dimensioning ranges, values lying within the specific limits are also disclosed as limiting values and can be used and claimed randomly. Further advantages, features and details of the invention can be found in the following description of the preferred exemplary embodiments as well as with reference to the drawing, in which:

Figure 2:
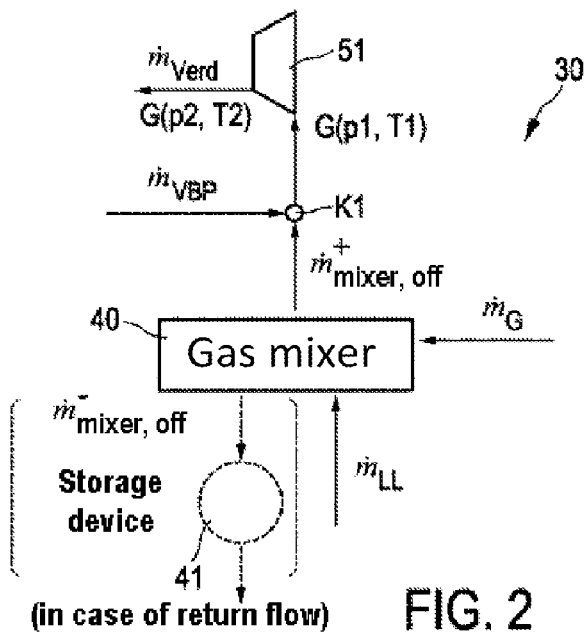
Figure 3:
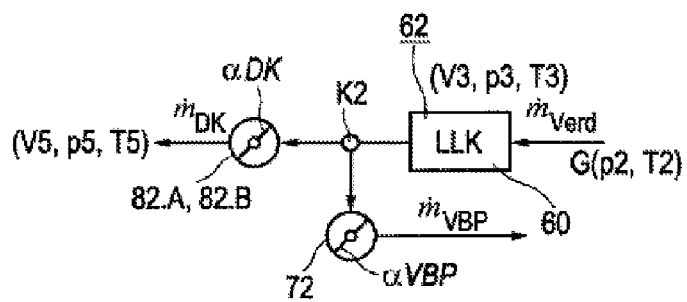
Figure 4:
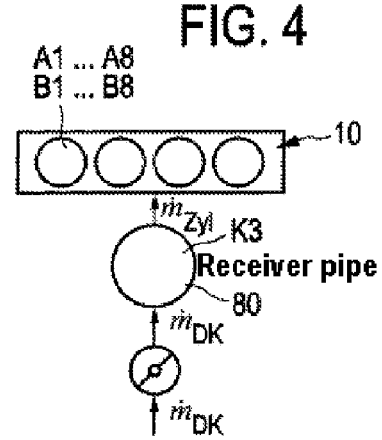
Figure 5:
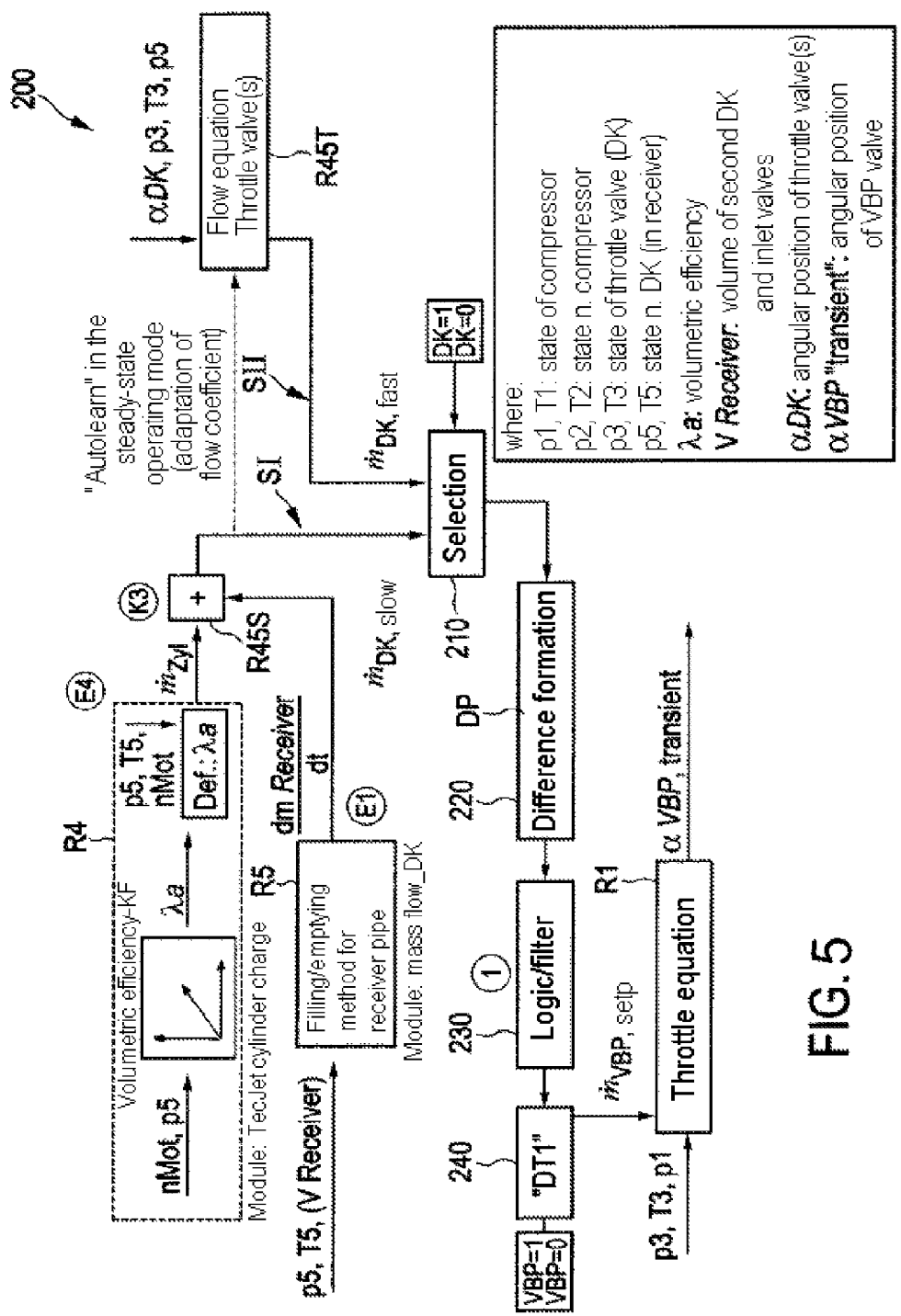

in an alternative which is shown by dashed lines, the gas internal combustion engine can also be configured as a gas-diesel internal combustion engine and can be operated in the pure diesel mode as well as in the mixed mode or in the pure gas mode (for example as an ignition spray mode with the injection of an ignition mixture in the form of diesel), wherein the injection system is in the form of a common rail system which is shown by dashed lines;

FIG. 2 shows a first computational diagram relating to the determination of a mixture composition (compressor bypass) by means of open-loop and/or closed-loop control, wherein a SETPOINT gas mass flow is calculated from the mixture mass flow which leaves the gas mixer, and wherein a return flow of gas-air mixture from the gas mixer to the air side is advantageously taken into account, specifically during which further enrichment by combustion gas during renewed suction is avoided, by storing the return flowing gas mass;

FIG. 3 shows a second computational diagram relating to the determination of a mixture composition (mass flow charge air radiator) by means of open-loop and/or closed-loop control, wherein a mixture mass flow which flows through the compressor into the container volume between the compressor outlet, throttle bypass valve and compressor bypass valve is calculated;

FIG. 4 shows a third computational diagram relating to the determination of a mixture composition (cylinder charge) by means of open-loop and/or closed-loop control, wherein a mixture mass flow which flows from the receiver volumes into the combustion chambers of the cylinders is calculated;

FIG. 5 shows a diagrammatic illustration of a preferred embodiment of a regulator structure for the gas mode, wherein a setting which is independent of a setting of an engine throttle is determined for a compressor bypass throttle, and wherein a relatively slow and a relatively fast setting prescription is made by determining a mixture mass flow via the engine throttle, wherein the relatively slow setting prescription is made on the basis of a quasi-steady-state mixture mass flow and/or the relatively fast setting prescription is made on the basis of a transient mixture mass flow via the engine throttle.

DETAILED DESCRIPTION OF THE INVENTION

Figure 1:
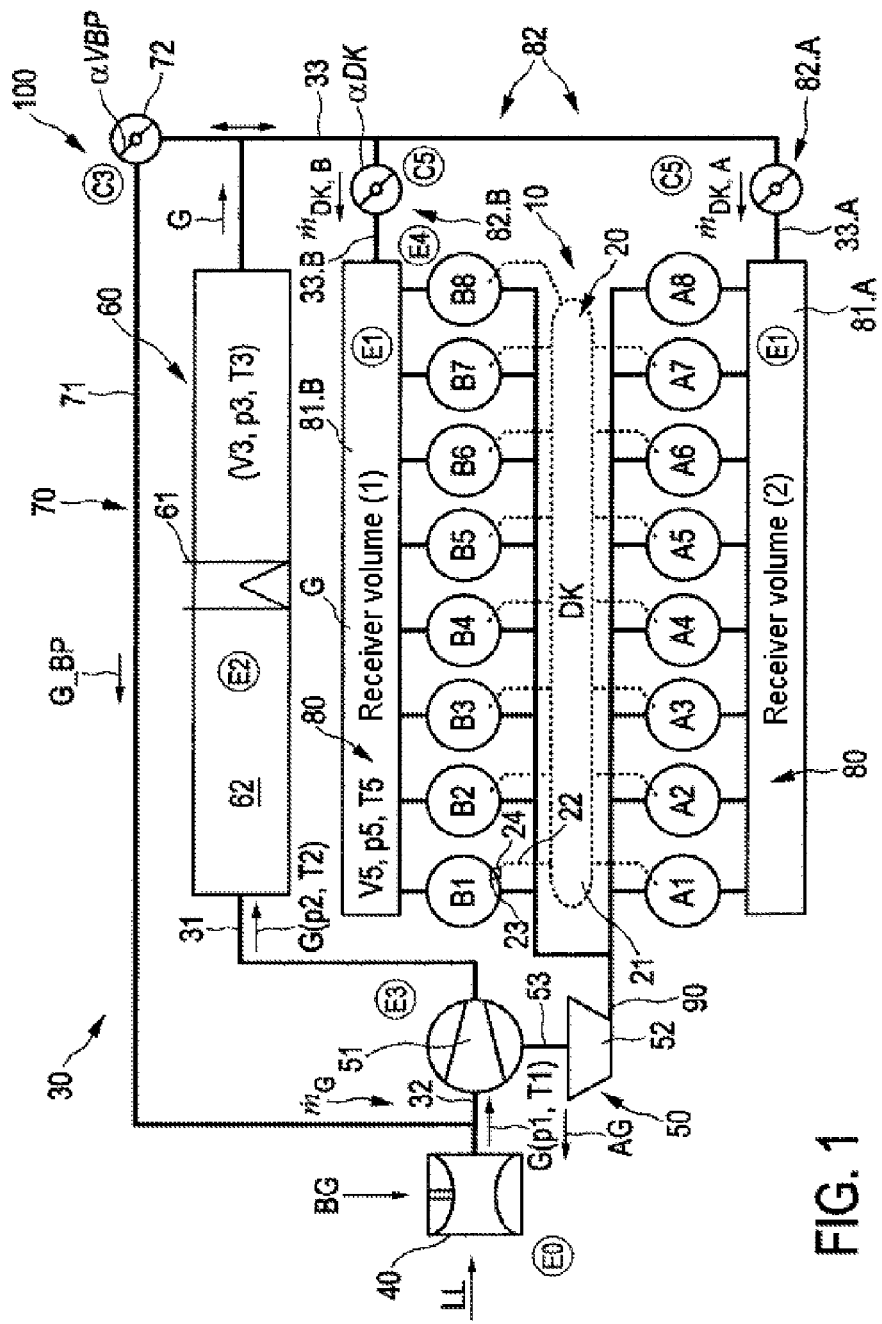
FIG. 1 shows a diagram of a gas internal combustion engine with a gas mixer and an intake section with a supercharging system by means of a turbocharger and a charge-type heat exchanger and an engine with a number of cylinders downstream of a receiver volume, wherein the supercharging system can be bypassed by means of a bypass section—the gas internal combustion engine is configured for spark-ignition gas operation.

FIG. 1 shows a gas internal combustion engine 100 with a motor 10 and an intake system with a branched intake section 30. Arranged in the intake section is, inter alia, a gas mixer 40 and, for the formation of a supercharging system, a turbocharger 50 and a charge-type heat exchanger 60, here in the form of a charge air radiator, and a bypass 70.

The engine is embodied here with a number of sixteen cylinders as a V-type engine with eight cylinders Ai, i=1..8 on an A side and eight cylinders Bi, i=1..8 on a B side; this type of cylinder arrangement and number is presented here merely by way of example. In particular for applications with large engines, configurations of the engine with ten, twelve, twenty, twenty-four or twenty-eight cylinders or some other number of cylinders is also suitable.

In the case of an alternative or additional configuration as a dual-fuel internal combustion engine, the internal combustion engine also has an injection system 20 (shown by dashed lines) which is formed here as a common rail system with a common rail 21 from which a number of injection lines 22—each with an injector 23 and an individual storage device 24 arranged upstream of the injector—branch off to one cylinder Ai, Bi, i=1..8 of the engine 10 in each case. The injection system 20 is designed to meter liquid fuel such as diesel or even another liquefied or liquid fuel, in order to inject the latter in a diesel mode as liquid fuel or in a gas mode or ignition spray mode as an ignition spray, in each case at the start of a working cycle of a cylinder Ai, Bi; and to do this at very high injection pressures. Accordingly, the engine 10 in this variant also has a common rail injection system 20 for a liquid fuel, in particular diesel fuel in this case, and a supercharging system 50 with a charge-type heat exchanger 60 and with a bypass 70 for bypassing the supercharging system 50 and the charge-type heat exchanger 60.

Referring again to the significant part of the embodiment (shown in broken lines), the gas mixer 40 which is connected to the intake section 30 at the inlet-side of the intake system sucks in charge air LL from the surroundings and adds combustion gas BG to it. The charge mixture, which can also be referred to as combustion gas mixture in the gas mode—also referred to below in abbreviated form as "mixture G"—with mass throughput rate $\dot{m}\_G$ ("(')" is illustrated in the drawing for the sake of clarity as a dot above the mass m or other variable), is fed with the intake pressure p1 and at an intake temperature T1, which corresponds substantially to the ambient temperature, via a compressor section 32 to a compressor 51 of the turbocharger 50 and compressed there to a compression pressure p2 at a compression temperature T2. The compressor 51 is driven by a turbine 52 and is seated therewith on a common charger axis 53; the turbine 52 of the exhaust gas section 90 is in turn driven by the exhaust gas AG, exiting the engine 10, in the exhaust gas section 90. The mass flow $\dot{m}\_G$, heated to the compression temperature T2 as a result of the compression, of the mixture G is fed to a cooling section 31 of the intake section 30 and conducted there in a charge-type heat exchanger 60 via a radiator structure 61; in the heat exchanger volume 62 which is illustrated symbolically here heat exchange occurs with a cooling medium in the radiator structure 61, with the result that the mixture G is cooled. The combustion gas mixture exits the heat exchanger volume of the size V3 in a cooled form at a charge temperature T3 and a charge pressure p3 in the direction of a charge section 33 for feeding the mixture G to the engine 10.

In an intake section model, the state of the mixture G upstream of the compressor 51 is comparatively generally specified by means of the state variables for pressure and temperature, in this case the intake temperature T1 and intake pressure p1 upstream of the compressor 51 or downstream of the compressor 51 with increased compression pressure p2 and increased compression temperature T2 with the state variables p2, T2 downstream of the compressor 51, described by means of a suitable compressor model; and this is done approximately according to a gas state equation, such as, for example, for an ideal or real gas. The following components of the heat exchanger 60 and of the receiver 80, such as, for example, a manifold and/or a collecting section are assigned particular significance as large volumes of the intake section 30 according to the concept of the invention, with the result that these and the further space of the intake section are assigned a heat exchanger volume V3 or a receiver volume V5 in the intake section model for the modeling of the further gas states. Accordingly, the combustion gas mixture G in the heat exchanger volume V3 assumes the state variables p3, T3, which occurs as a result of the cooling and a volume increase when the charge pressure and charge temperature p3, T3 decrease.

The state of the mixture G in the bypass 70 is basically also determined in accordance with the state variables p1, T1 at the inlet or p3, T3 at the outlet of the bypass 70, or conversely in the case of return flow through the bypass 70; i.e. a bypass gas mixture G_BP in the bypass section 71 of the bypass 70 is set as a function of the prevailing pressure ratios and the setting of the compressor bypass throttle 72—here according to the setting angle αVBP of the compressor bypass valve. The bypass section 71 can serve, in particular, to recirculate excessive mixture G upstream of the compressor 51 in order to feed this once more in a compressed form to a for the combustion in the cylinders Ai, Bi of the engine 10.

Before the gas mixture G is fed in the state p3, T3 to the engine 10, said gas mixture G is fed into the receiver 80 while changing the pressure and the temperature—in accordance with the receiver volume V5 at the receiver pressure p5 and receiver temperature T5—in accordance with a mass flow m(')_DK, fed into the receiver volume 81 via the engine throttle 82. Here, in each case a first and a second receiver volume 81.B, 81.A is assigned to a B side or an A side of the engine 10, i.e. the latter are arranged upstream of the cylinders Ai, Bi and downstream of the first and second charge sections 33.B, 33.A of the B side and A side and downstream of the heat exchanger volume 62. The engine throttle 82 is formed here by means of a first and a second engine throttle valve 82.B, 82.A, which are each assigned to the first and second receiver volumes 81.B, 81.A, wherein the first and the second engine throttle valves 82.B, 82.A can be set independently of one another; in the text which follows, reference is made to these together under the engine throttle 82, where it is simpler. The receiver volume 81 is to be understood as the sum of the first and second receiver volumes 81.A and 81.B. In the receiver volume 81, the mixture G assumes the gas states characterized by p5 and T5 owing to the increase in volume and as a function of the setting αDK of the engine throttle valves 82.A, 82.B in the volume V5 of the receiver volume 81; and this occurs as a function of the B-side or A-side mass throughput rate m(')_DK, B or m(')_DK, A, depending on the setting of the engine throttle valves 82.B and 82.A.

The states of the gas mixture G which are characterized by pi, Ti, i=1.2 and Vj, pj, Tj, j=3.5 are therefore determined essentially in the regions such as are indicated by the compressor 51, the heat exchanger volume 62 and the receiver volume 81 or against the limits which are given by the engine throttle 82 and the compressor bypass throttle 72 or the compressor 51.

It is apparent that there is a need for improvement in the case of closed-loop control for the operation of an internal combustion engine as a gas internal combustion engine 100, particularly taking into account the intake section 30 which is illustrated in more detail in the excerpt in FIG. 2 with the gas mixer 40 and the compressor 51, and in FIG. 3 with the charge-type heat exchanger 60, and in FIG. 4 with the receiver 80. For the sake of simplicity, identical reference symbols are used in the text which follows for identical or similar parts or parts with identical or similar functions.

It is apparent that the setting of the mass flows m(')_G for combustion gas BG and m(')_LL for charge air LL at the gas mixer 40 in accordance with a combustion air ratio LAMBDA_SETPOINT or a stoichiometric air ratio Lst does not necessarily have to be carried out with an assumption of steady-state conditions along the intake section. Therefore, the concept of the invention takes into account, in an intake section model such as is described by means of FIG. 1, at least two large volumes for combining the volume of the intake section, specifically the receiver volume 80 and the charge-type heat exchanger volume 62. The intake section 30 is modeled within the scope of the intake section model on the basis of the filling and emptying method such as is basically known. The changes in state in the volumes are considered here to be quasi-isothermic. This simplifies the system through limitation to maintaining the masses in terms of an adiabatic point of view, and simplifies, in particular, a simultaneous calculation of the internal combustion engine or of the intake section thereof in real time. However, basically an adiabatic point of view with sufficient computational capacity can also be used to simulate the changes in state in the intake section.

Furthermore, specific assumptions are implemented for devices of the intake section within the scope of additional models, in particular when measured values are not available for the corresponding device of the intake section 30. This relates, for example, to the additional model of a compressor which describes the activity of the compressor 51 and the states of the mixture G upstream of the compressor by means of temperature and pressure (G(p1, T1)) and downstream of the compressor (G(p2, T2)).

FIG. 2 clarifies in this respect in a further additional fashion the mixture mass flows m(') downstream of the gas mixer 40 for the mixture portion G(p1, T1), specifically the mixture mass flow m(')$^+$_MIXER, OFF. The latter is fed to the compressor 51, for example, in the steady-state operation with the compressor bypass valve 72 closed. This proves particularly advantageous for keeping in reserve or improving a load cut-in potential of the engine 10.

When the compressor bypass valve 72 is opened, recirculation of excessive gas mixture G upstream of the compressor 51 can also take place; this is represented by the recirculated mass flow m(')$^{--}$_VBP. In this state, the compressor 51 is supplied with a collected mass flow m(')_MIXER, OFF$^+$ plus m(')_VBP. The mass flow m(')_VERD which leaves the compressor 51 corresponds to a mixture state G(p2, T2) with the mixture mass flow m(')_VERD. On this basis, the SETPOINT gas mass flow can be calculated from the mixture mass flow which leaves the gas mixer 40. For this purpose, a continuity equation for the mixture mass flow at the node point K1 can be postulated in the form m(')_MIXER, OFF=m(')VERD minus m(')_VBP.

As explained and shown in FIG. 2, when high loads are shed, a return flow of air-gas mixture with the mixture mass flow m(')_VBP can occur from the gas mixer 40 to the air side; this situation is represented by dashed lines in FIG. 2. In order to avoid further enrichment by combustion gas G during the renewed induction, storage of the return flowing gas mass m(')$^{--}$_MIXER, OFF can take place in a storage device 41 which is assigned to the gas mixer 40. The storage device 41 can be limited to appropriate values in terms of its size. The calculation of the mixture mass flows include the stoichiometric air requirement Lst and a SETPOINT value of the combustion air ratio LAMBDA_SETPOINT. The implementation can take place in a closed-loop control unit, on which a corresponding computational module is based.

FIG. 3 shows symbolically a model illustrating a continuity equation for a mixture mass flow m(')_VERD, leaving the compressor 51, to be fed to the charge air radiator LLK, which is illustrated here as a charge-type heat exchanger 60 with exchanger volume 62. Calculation of the mixture mass flow which flows through the compressor 51 into the container volume between the compressor outlet and engine throttle 82.A, 82.B and compressor bypass valve 72 occurs according to FIG. 3 as a change in time m(')=m(')VERD minus m(')DK minus m(')_VBP. This continuity equation such as is illustrated symbolically in FIG. 3 at the node point K2, can be solved by assuming certain thermodynamic conditions such as, for example, a constant mixture composition and isothermic conditions or adiabatic conditions.

The calculation of the mixture mass flow which flows back via the compressor bypass 71 can be specified by postulating a flow function, for example for isoentropic flows. For this purpose, the reduced mass flow m(')_VBP can be illustrated by means of the flow function of the compressor bypass section 71 as a characteristic diagram. The composition of the mixture and the compressibility can be assumed here as approximately constant. Likewise, the calculation of the pressure and temperature in the charge air radiator LLK can be carried out by means of a simple pressure loss model for the charge air radiator 61. For example, for this purpose a turbulent or less turbulent flow can be assumed by specifying a suitable Reynold's number, and a smooth pipe according to Blasius can be assumed.

The calculation of the temperature at G(p2, T2) can be implemented on the basis of a compressor efficiency characteristic diagram. The continuity equation at the node point K2 takes into account, in a corresponding computational module of a closed-loop control unit, inter alia, also the valve settings αDK and αdVBP of the throttles 72, 82 according to the concept of the invention.

Also referring to FIG. 4, there is the possibility of calculating the mixture mass flow m(')_DK which is dependent on the throttle valve setting αDK of the engine throttle 82 upstream of the receiver pipe and flows into the receiver volume 80; or leaves the latter in the direction of the cylinders m(')_ZYL. This can be done by calculating the mixture mass flow, which flows through the engine throttle valves 81.A, 81.B into the receiver volumes 81.A, 81.B, according to a continuity equation for the node point K3, specifically as a change over time according to m(')_DK− m(')_ZYL, for example assuming a constant mixture composition and a constant temperature (isotropic conditions). However, the implementation at the node point K3 can also take place within the scope of a differential equation, as is explained below by means of FIG. 5.

FIG. 5 also shows within the scope of a flowchart a preferred embodiment of a regulated structure of a closed-loop control system 200 for an internal combustion engine which is designed, in particular, to cause a setting of the engine throttle 82, i.e. the valves 82.A, 82.B, and/or of the compressor bypass throttle 72 during operation of the internal combustion engine in order to influence a mixture portion of the gas-air mixture. As a result, a chronologically appropriate setting, following the dynamics of operation, of the mixture mass flow m(')_DK to the receiver pipe 80 or the mixture mass flow m(')_VBP via the bypass section 70 upstream of the compressor 51 can be brought about in an opposing dependence; however, at any rate a chronologically advantageous setting of the mixture mass flow m(')_ VBP downstream of the mixture mass flow m(')_DK to the receiver pipe 80.

The objective of the structure of the regulator 200 is the closed-loop control of the throttle valves 82, 72, specifically, in particular, the closed-loop control of the αVBP after the predefinition of the setting angle αDK. For this purpose, the mixture mass flow m(')_DK via the engine throttle valve is simulated on two different timescales. In each case as a function thereof, the mixture mass flow m(')_VBP via the bypass section 70 is determined; on the one hand on a relatively fast timescale on the basis of the actuation path SII and on the other hand on a relatively slow timescale on the basis of the actuation path SI.

For this purpose, the structure of the regulator 200 provides the first actuation path SI and the second actuation path SII. In the first actuation path SI, the setting αVBP of the compressor bypass throttle 72 is to be determined, in particular for steady-state operation, as a function of a setting αDK of the engine throttle 82 by means of a first relatively slow timescale. According to the second actuation path SII, the setting αVBP of the compressor bypass throttle 72 is to be determined, in particular for transient operation, as a function of the setting αDK of the engine throttle 82 by means of a second relatively fast timescale. The first and second actuation paths SI, SII are firstly configured to determine a mass flow m(')_DK via the engine throttle 82, on the one hand, on a relatively fast timescale by means of a flow equation of the regulating point R45T and, on the other hand, on a relatively slow timescale by means of a filling and emptying method of the regulating point R45S.

The first actuation path SI which is responsible for the relatively slow timescale is designed to determine the setting of the engine throttle αDK or a mass flow via the engine throttle 82 by determining a quasi-steady-state mixture mass flow for at least the receiver volume 80. For this purpose, a regulating unit R4 for describing a cylinder charge at the device E4 is provided here—as is shown by FIG. 1 between a receiver volume 80 and a cylinder Bi, Ai, i=1.8 here—and a further regulating unit R5 for modeling the receiver volume 80 is provided; this as a further device E1 here, as is shown by FIG. 1. The first regulating unit R4 supplies a mixture mass flow m(')_ZYL to the cylinder approximately taking into account a continuity equation according to the filling and emptying method as is illustrated in FIG. 4. The further regulating unit R5 supplies the mixture mass flow via the engine throttle 82 into the receiver volume 80 taking into account a continuity equation according to the filling and emptying method for the receiver pipe 80, also according to FIG. 4.

The regulating unit R4 stipulates the engine rotation speed nMOT and a pressure p5 as well as a temperature T5 in the receiver volume 80 and determines a volumetric efficiency number LAMBDA_a for the volumetric efficiency by means of a volumetric efficiency characteristic diagram KF. The SETPOINT mass flow into the cylinder m(')_ZYL which is to be stipulated is obtained here as a function of this volumetric efficiency number LAMBDA_a. The change in the quasi-steady-state mixture mass flow for the receiver volume 80 comes about in the described way by means of the further regulating unit R5. The two variables can be used at the node point K3, here in accordance with the regulating point R45S, according to the approach described above to determine a quasi-steady-state mixture mass flow m(')_DK, which is to be stipulated on a relatively slow timescale, slowly via the engine throttle 82. The result is fed to a selection point 210 of the regulator 200.

The first control path SI can, when necessary, also model the supercharging system in a less costly fashion; for example if the supercharging system is provided with a charge-type heat exchanger, preferably in the form of a single-stage or two-stage supercharging system, preferably with exhaust gas recirculation. It is therefore possible, for example, for the intake section model to take into account at least one mixture mass flow and/or state of the mixture portion in the receiver volume and/or the state of the charge-type heat exchanger 61 and/or of the bypass section 71. For this purpose, further regulating units which are not shown here, for example a regulating unit R3 for a device E2 using the filling/emptying method for the charge-type heat exchanger 60 can be provided.

In contrast, for a transient operating state the regulator 200 provides a regulating point R45T which, in contrast to the regulating point R45S which is configured for a quasi-steady-state operating simulation, solves transient operation in the scope of a flow equation taking into account a throttle valve setting αDK of the model, as illustrated in FIG. 3. For this purpose, a transient mixture mass flow m(')_DK_is found quickly by means of the engine throttle 82 within the scope of a solution of the flow equation—by means of differential steps (with a finite incremental rate) or in a differential solution (with infinitesimal increments); the thermodynamic state p3, T3 of the mixture G in the charge-type heat exchanger 60 or the thermodynamic state p5, T5 in the receiver volume 80 are taken into account.

In other words, the mixture mass flow m(')_DK_can quickly be solved in a chronologically transient fashion in time increments via the engine throttle 82 by taking into account the spatial aspects of the intake section model. The time increments may be finite (differential equation) or infinitesimally small (differential equation). This determination, associated with relatively high computational expenditure, of the mixture mass flow m(')_DK, quickly via the engine throttle 82, takes place in the second branch SII of the regulator 200 and is also fed to the selection point 210 of the regulator 200. The so-called sampling rate 1/TS (finite or infinitesimally small) for the differential solution of the flow equation can be set depending on requirements. The number of time increments TS across the differences or mean values should, on the one hand, be of such a magnitude that the noise is minimized. The number of time increments TS should then be as small as necessary in order to be able to represent the fastest possible response behavior of the throttle valve 82 in real time within the scope of the available computational capacity.

The selection point 210 can be configured to be aimed at a specific operating state. For this purpose, for example the selection point 210 can comprise a binary switch unit which detects operation if the throttle valve 82 is entirely or partially, in particular completely, opened (DK=1); in particular, the selection of a transient calculation mode then makes sense. If, on the other hand, the throttle valve 82 is completely closed (DK=0), this can relate to a state in which the throttle valve closes or is closed and a further calculation of values assigned to a transient operating state is in my opinion not appropriate.

Furthermore, the selection point 210 can be configured already to detect an operating mode of steady-state or transient operation, which, for example, detects transient operation if the throttle valve 82 is only partially opened.

In a difference-forming unit 220 there is then provision that a differential value Δ (in FIG. 2 of the drawing), for example of a mass flow Δm(')_DK or of a pressure value Δp associated therewith is formed over a time period and/or at the same time via the engine throttle 82 (Δ=p5−p3). A steady-state or transient operating mode of the internal combustion engine 100 can be inferred by means of the differential value Δ. For example, if the differential value Δ exceeds a specific magnitude, a transient operating mode can be inferred, and if the differential value Δ undershoots a specific magnitude a steady-state operating mode can be inferred.

In a logic unit 230 of the regulator it is then possible to provide under "1" testing as to whether the differential value Δ (for example a differential value Δ=p5−p3) or a differential mass flow m(')_DK is above a limiting value. It is also possible to check in the logic unit 230 whether the differential value Δ runs through or has run through a change of sign within a specific time period. This determination preferably takes place as a function of the selection signal of the selection point 210; i.e. a differential value ΔS or ΔT is preferably formed, either for a quasi-steady-state variable m(')_DK_slow or for a transient variable m(')_DK, quickly. As a result of a timescale which is adapted in such a way, in particular oscillation or excessively slow regulating dynamics are avoided.

If closing of the bypass section 71 cannot be detected in a further regulating unit 240 as a result of closing of the compressor bypass throttle 72 (VBP=0), a mixture mass flow m(')_VBP,SETPOINT can be specified in a further step by solution of the continuity flow illustrated in FIG. 3; i.e. if (VBP=1) is present in the regulating unit 240.

An advantage of the structure of a regulator 200 shown in FIG. 5 is that a comparatively precise signal of m(')_VBP, SETPOINT can be determined as a function of a selection in the selection point 210 in the steady-state operating mode by means of m(')_DK_slow. This is implemented by means of the intake section model which in the steady-state operating mode also corresponds to the time development in the real system of the internal combustion engine 100.

However, if, for example owing to the selection signal (DK=1), transient operation of the internal combustion engine is displayed and if this is confirmed, in particular, by the difference formation in the regulator point 220, the throttle valve setting αVBP can be predefined comparatively quickly by means of the SETPOINT mass flow via the compressor bypass valve 72 as a function of the engine valve setting αDK. This gives rise to a reaction of the bypass section 71 to the engine throttle 82 which can be brought about virtually synchronously.

In the event of a selection DK=1, on the basis of the SETPOINT value of a compressor bypass setting αVBP and the mixture states P3, T3 in the charge-type heat exchanger 60 or p1, T1 upstream of the compressor 51 in the regulator unit R1 it is possible to infer the setting of a compressor bypass throttle αVBP,transient using a throttle equation. This is also carried out within the scope of the continuity equation illustrated in FIG. 3 and/or by taking into account the filling and emptying method; in this present case, m(')_VERD, m(')_DK and m(')_VBP are relevant. In other words, the throttle equation, stored in the regulating unit R1, for the compressor bypass throttle 72 can occur either as a function of a mass flow which is slower in a quasi-steady-state fashion via the engine throttle 82 (actuation path SI), or else as a function of a comparatively fast signal of a mixture mass flow via the engine throttle 82 from a second path SII. In the first case, comparatively precise determination αVBP of the bypass throttle 72 results. In the second case, a setting αVBP,transient of the bypass throttle 72, which reacts very quickly to the setting αDK of the engine throttle 82, results.

Therefore, in particular in the latter case a situation is avoided in which in the event of the engine throttle 82 closing, compressor pumping occurs if the compressor 51 of the exhaust gas turbocharger is operated briefly outside its operating range as a result of a rapid reduction in the gas mass flow m(')_VERD which is fed through it. As a result of the fast opening—ensured within the scope of the structure (illustrated here) of the regulator 200—of the compressor bypass valve 72, the pumping can be avoided; specifically since the compressor bypass mass flow m(')_VBP permits rapid discharging of the pressure p3 via the bypass section 71 when the engine throttle 82 is closed.

On the other hand, the load cut-in potential of a gas motor 100 can be improved by closing the compressor bypass valve 72 if the latter was opened, for example, in a quasi-steady-state operating mode (m(')_DK_slow), (DK=0 in the selection point 210). The necessity to set the bypass throttle 72 results from the sequence of the differential point 220 and the logic point 230 in the controller 200; an action of the bypass throttle 72 occurs here only in the setting without closure and if pressures or signs are subject to serious changes.

An example is a mass flow m(')_DK via the engine throttle 82 for different variables of sampling rates TS in the solution of the flow equation in the regulator unit R45T. A first solution, which turns out to be rather flat, for a sampling rate TS_high, (with comparatively large increments) would appear to virtually reproduce the result of a quasi-steady-state mixture mass flow development. The second possibility is that an excessively high sampling rate (with comparatively short increments) was selected; in that case, the regulator 200 would react too quickly as a system. This would lead to a highly varying regulator setting which would not reliably represent the real operation, in particular with gradients which are excessively steep and fluctuate too much.

On the other hand, if the selection of the sampling rate is approximately in the range of a timescale of an actual transient development, precisely the mixture mass flow via the throttle valve 82 within the scope of a second control branch SII is represented. In that case, a virtually synchronous reaction of the bypass 70 can take place if the selection point 210 determines a transient assessment of the position.

The invention claimed is:

1. A method for operating an internal combustion engine which has an intake section and an engine with a number of cylinders and a receiver which is arranged upstream of the cylinders, wherein the intake section has a supercharging system having a compressor and a bypass for bypassing the supercharging system, and wherein the receiver is assigned an engine throttle, and the bypass is assigned a compressor bypass throttle, the method including setting the engine throttle and/or the compressor bypass throttle as a function of operation in order to influence a charge fluid, wherein the intake section is assigned an intake section model by which at least one mass flow and/or state of the charge fluid upstream of the engine is determined on a first timescale and on a second timescale faster than the first timescale and based on the determination result the compressor bypass throttle is set as a function of the engine throttle.

2. The method as claimed in claim 1, wherein the compressor bypass throttle is set as a function of the engine throttle on the first timescale, by determining a quasi-steady-state mixture mass flow for at least the receiver volume and/or by determining a quasi-steady-state mixture mass flow for a heat exchanger by a filling and emptying method for the receiver volume and/or the heat exchanger.

3. The method as claimed in claim 1, wherein the compressor bypass throttle is set as a function of the engine throttle on the second timescale by determining a transient mixture mass flow for the engine throttle by at least one time-dependent flow equation for the engine throttle, taking into account a time-dependent flow equation for the compressor bypass throttle.

4. The method as claimed in claim 1, wherein an open cross section setting of the compressor bypass throttle is determined as function of a setting of the engine throttle in real time and/or simultaneously, for a first case of the first timescale and/or a second case of the second timescale.

5. The method as claimed in claim 4, wherein for setting the engine throttle the following are taken into account on the first and/or the second timescale:
   a mixture mass flow across the engine throttle, and/or
   a mixture state in the receiver.

6. The method as claimed in claim 1, wherein the compressor bypass throttle is set as a function of the engine throttle for transient operation of the engine, wherein an operating mode of transient operation is selected by forming at least one differential value across the engine throttle relating to the mixture mass flow and/or the mixture state of the mixture portion.

7. The method as claimed in claim 1, wherein within a simultaneous real-time determination, by the intake section model, serving as a basis of a computational model for the intake section, in a closed-loop control system at least one input mixture portion, assigned to an earlier mixture state, of the gas-air mixture is formed, by an output mixture portion, assigned to at least one later mixture state, of the gas-air mixture.

8. The method as claimed in claim 1, including determining by way of the intake section model at least one mixture mass flow across at least one engine throttle and across at least one compressor bypass throttle and/or
   a mixture state of the mixture portion in at least one receiver volume and at least one further large volume of the intake section.

9. The method as claimed in claim 8, wherein the further large volume is that of at least one of a charge-type heat exchanger, a bypass section and a compressor.

10. The method as claimed in claim 1, wherein in one of the operating modes a steady-state or transient operation is detected by a differential value of a mass-flow difference and/or a pressure difference or some other mixture state across the engine throttle, including,
   in an operating mode of transient operation detecting if the differential value is above a first limiting value and/or has a change of sign, and,
   in an operating mode of steady-state operation detecting if the differential value is below a second limiting value or does not have a change of sign.

11. The method as claimed in claim 1, wherein in case of steady-state operation of the internal combustion engine coefficients of a time-dependent flow equation are scaled by comparison of computational results relating to the first timescale based on a filling and emptying method, and computational results relating to the second timescale based on a flow equation.

12. The method as claimed in claim 1, wherein the engine throttle is assigned a first throttle characteristic diagram and/or the compressor bypass throttle is assigned a second throttle characteristic diagram, wherein
   the first and/or second throttle characteristic diagram each specify a quasi-steady-state mass flow,
   in a first dependence on a pressure upstream and/or downstream of the throttle, and/or
   in a second dependence on a throttle setting.

13. The method as claimed in claim 1, wherein the mass flow is a mixture mass flow and the state is a mixture state.

14. A closed-loop control system for an internal combustion engine having an engine with a number of cylinders, the closed-loop control system comprising:
   an intake section and a receiver which is arranged upstream of the cylinders, wherein the intake section has a supercharging system having a compressor and a bypass for bypassing the supercharging system, wherein the receiver is assigned an engine throttle, and the bypass is assigned a compressor bypass throttle, and wherein a setting of the engine throttle and/or of the compressor bypass throttle for influencing a mixture portion of the gas-air mixture is settable as a function of operation by the closed-loop control system, wherein
   in the closed-loop control system of the intake section, an intake section model is assigned, by which at least one mixture mass flow and/or mixture state of the mixture portion upstream of the engine is determined on a first timescale and on a second timescale faster than the first timescale and based on a determination result,
   the compressor bypass throttle being set as a function of the engine throttle by the closed-loop control system.

15. The closed-loop control system according to claim 14, wherein the closed-loop control system is configured:
   to determine a mixture mass flow and/or a mixture state of the mixture portion in real time and/or simultaneously, and
   to force the compressor bypass throttle to be set as a function of the engine throttle on one of the timescales.

16. An internal combustion engine, comprising:
   an engine having a number of cylinders; and
   a closed-loop control system as claimed in claim 14.

17. The internal combustion engine as claimed in claim 16, wherein the internal combustion engine is a gas internal combustion engine.

18. The internal combustion engine as claimed in claim 16, wherein the internal combustion engine is a dual-fuel internal combustion engine.

* * * * *